(12) United States Patent
Takagaki et al.

(10) Patent No.: US 9,295,944 B2
(45) Date of Patent: Mar. 29, 2016

(54) ELECTRICALLY HEATED CATALYST DEVICE AND ITS MANUFACTURING METHOD

(75) Inventors: Tadashi Takagaki, Toyota (JP); Yasuo Kinoshita, Aichi-gun (JP); Kenji Shimoda, Nagoya (JP); Kazuaki Nishio, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 86 days.

(21) Appl. No.: 14/356,261

(22) PCT Filed: Dec. 27, 2011

(86) PCT No.: PCT/JP2011/007328
§ 371 (c)(1),
(2), (4) Date: May 5, 2014

(87) PCT Pub. No.: WO2013/098889
PCT Pub. Date: Jul. 4, 2013

(65) Prior Publication Data
US 2014/0301908 A1 Oct. 9, 2014

(51) Int. Cl.
*B01D 50/00* (2006.01)
*B01D 53/94* (2006.01)
(Continued)

(52) U.S. Cl.
CPC ............... *B01D 53/94* (2013.01); *B01D 53/96* (2013.01); *B01J 35/04* (2013.01); *F01N 3/2013* (2013.01);
(Continued)

(58) Field of Classification Search
CPC ........ F01N 3/2828; B01D 53/96; B01J 35/04; Y02T 10/26; Y02T 29/49099
USPC ........................................................ 422/174
See application file for complete search history.

(56) References Cited

U.S. PATENT DOCUMENTS

| 5,569,455 A | * | 10/1996 | Fukui | B01D 53/945 |
| | | | | 422/174 |
| 5,588,292 A | * | 12/1996 | Hiraishi | F01N 3/2026 |
| | | | | 422/174 |
| 5,793,276 A | | 8/1998 | Tosaka et al. | |

(Continued)

FOREIGN PATENT DOCUMENTS

| JP | 60-71095 | 5/1985 |
| JP | 60-71096 | 5/1985 |
| JP | 9-199307 | 7/1997 |
| JP | 2011-106308 | 6/2011 |

(Continued)

OTHER PUBLICATIONS

International Search Report issued Mar. 19, 2012, in PCT/JP11/007328 filed Dec. 27, 2011.

*Primary Examiner* — Tom P Duong
(74) *Attorney, Agent, or Firm* — Oblon, McClelland, Maier & Neustadt, L.L.P.

(57) ABSTRACT

An electrically heated catalyst device includes a catalyst support including a ceramics, on which a catalyst is supported, a pair of surface electrodes disposed on an outer surface of the catalyst support, the surface electrodes being disposed opposite to each other and extending in an axial direction of the catalyst support, and a wiring line that externally supplies electric power to the surface electrodes, in which the catalyst support is electrically heated through the surface electrodes. A wrought member made of metal is buried in the surface electrodes, the wrought member extending in the axial direction of the catalyst support. With the configuration like this, the spreading of electric currents in the catalyst-support axis direction can be maintained even when cracks occur in the catalyst-support circumference direction in the surface electrodes.

15 Claims, 9 Drawing Sheets

(51) Int. Cl.
    *B01J 35/04*     (2006.01)
    *H01C 17/06*     (2006.01)
    *H01C 17/28*     (2006.01)
    *B01D 53/96*     (2006.01)
    *F01N 3/20*     (2006.01)
    *F01N 3/28*     (2006.01)

(52) U.S. Cl.
    CPC ............... *F01N 3/2828* (2013.01); *H01C 17/06* (2013.01); *H01C 17/28* (2013.01); *Y02T 10/26* (2013.01); *Y10T 29/49083* (2015.01); *Y10T 29/49099* (2015.01); *Y10T 29/49345* (2015.01)

(56) References Cited

U.S. PATENT DOCUMENTS

| | | | |
|---|---|---|---|
| 8,506,894 B2 * | 8/2013 | Ido | ............ B03C 3/455 |
| | | | 422/174 |
| 2004/0126286 A1 * | 7/2004 | deRuyter | ............ B01D 53/8631 |
| | | | 422/177 |
| 2010/0308849 A1 * | 12/2010 | Bouteiller | ............. F01N 3/0222 |
| | | | 324/700 |

FOREIGN PATENT DOCUMENTS

JP         2011256816 A  *  12/2011  ................ F01N 3/20

* cited by examiner

ELECTRICALLY HEATED CATALYST DEVICE AND ITS MANUFACTURING METHOD

TECHNICAL FIELD

The present invention relates to an electrically heated catalyst device and its manufacturing method.

BACKGROUND ART

In recent years, EHCs (electrically heated catalysts) are attracting attention as an exhaust purification device that purifies exhaust gases discharged from engines of automobiles and the like. In EHCs, it is possible to forcibly activate a catalyst by electrical heating even under such conditions that the temperature of the exhaust gas is low and thus the catalyst cannot be easily activated, such as immediately after the engine is started, and thereby to enhance the purification efficiency of the exhaust gas.

An EHC disclosed in Patent literature 1 includes a cylindrical catalyst support having a honeycomb structure on which a catalyst such as platinum and palladium is supported, and a pair of surface electrodes that are electrically connected to the catalyst support and disposed opposite to each other on the outer surface of the catalyst support. In this EHC, the catalyst supported on the catalyst support is activated by electrically heating the catalyst support between the pair of surface electrodes. In this way, unburned HC (hydrocarbon), CO (carbon monoxide), NOx (nitrogen oxide), and the like contained in an exhaust gas that passes through the catalyst support are removed by the catalytic reaction.

Since an EHC is disposed on an exhaust path of an automobile or the like, the material for the above-described surface electrode needs to have, in addition to the electrical conductivity, heat resistance, oxidation resistance at a high temperature, corrosion resistance in an exhaust-gas atmosphere, and the like. Therefore, as mentioned in Patent literature 1, metallic material such as a Ni—Cr alloy and an MCrAlY alloy (M is at least one material selected from Fe, Co and Ni) is used. The surface electrode is formed on the catalyst support by thermal spraying. Meanwhile, as for the material for the above-described catalyst support, ceramic material such as SiC (silicon carbide) is used. As a result, when the EHC is electrically heated, a thermal stress occurs due to the difference between the linear expansion coefficient of the metallic material forming the surface electrode and that of the ceramic material forming the catalyst support.

CITATION LIST

Patent Literature

Patent literature 1: Japanese Unexamined Patent Application Publication No. 2011-106308

SUMMARY OF INVENTION

Technical Problem

The inventor has found the following problem to be solved. The surface electrodes of an EHC are disposed so as to extend in the axial direction of the cylindrical catalyst support. Further, metal wiring lines are connected at the center in the catalyst-support axial direction in each surface electrode, and an electric current is supplied therethrough. This electric current spreads in the catalyst-support axial direction in each surface electrode, so that the entire catalyst support is electrically heated between the pair of surface electrodes.

When the electrical heating is repeated, cracks occur in the surface electrodes in the catalyst-support circumference direction due to the above-described thermal stress and the spreading of electric currents in the catalyst-support axis direction is thereby hampered. As a result, there is a problem that the area near the connection points between the surface electrode and the metal wiring lines (the central area of the catalyst-support in the axial direction) is intensively heated.

The present invention has been made in view of the above-described circumstance, and an object thereof is to provide an electrically heated catalyst device capable of maintaining the spreading of electric currents in the catalyst-support axis direction even when cracks occur in the catalyst-support circumference direction in the surface electrodes.

Solution to Problem

An electrically heated catalyst device according to an aspect of the present invention includes:

a catalyst support including a ceramics, on which a catalyst is supported;

a pair of surface electrodes disposed on an outer surface of the catalyst support, the surface electrodes being disposed opposite to each other and extending in an axial direction of the catalyst support; and a wiring line that externally supplies electric power to the surface electrodes, in which the catalyst support is electrically heated through the surface electrodes, and a wrought member made of metal is buried in the surface electrodes, the wrought member extending in the axial direction of the catalyst support.

It is possible to provide an electrically heated catalyst device capable of maintaining the spreading of electric currents in the catalyst-support axis direction even when cracks occur in the catalyst-support circumference direction in the surface electrodes.

The wrought member is preferably is one of a mesh, wires, and a perforated plate. In this way, the spreading of electrical currents in the catalyst-support axis direction can be reliably maintained.

Further, the surface electrodes are preferably formed by thermal spraying.

Further, a hollow space is preferably formed between the catalyst support and the wrought member. In this way, the thermal stress is alleviated.

Further, the wrought member preferably includes a bonding region to which the surface electrode is bonded and a non-bonding region to which the surface electrode is not bonded. In this way, the thermal stress is alleviated.

Further, in order to enable the electrically heated catalyst device to be used in an environment at a temperature of 800° C. or above, the wrought member is preferably made of one of a stainless-steel-based alloy, a Ni-based alloy, and a Co-based alloy.

The connection area in the surface electrode in which the wiring line is connected is preferably located at the center in the axial direction of the catalyst support.

The ceramics preferably includes SiC.

Further, the surface electrode preferably includes a Ni—Cr alloy (with a Cr content of 20 to 60 mass %) or an MCrAlY alloy (M is at least one material selected from Fe, Co and Ni).

A manufacturing method of an electrically heated catalyst device according to an aspect of the present invention is a manufacturing method of an electrically heated catalyst device that electrically heats a catalyst support including a ceramics, on which a catalyst is supported, through surface electrodes formed on a surface of the catalyst support, the manufacturing method includes:

forming a pair of the surface electrodes disposed on an outer surface of the catalyst support, the surface electrodes being disposed opposite to each other and extending in an axial direction of the catalyst support; and connecting a wiring line that externally supplies electric power to the surface electrodes, in which in the forming of the surface electrodes, a wrought member made of metal is buried in the surface electrodes, the wrought member extending in the axial direction of the catalyst support.

The wrought member is preferably one of a mesh, wires, and a perforated plate.

Further, in the forming of the surface electrodes, a thermal-spraying is preferably performed over the wrought member put on the catalyst support.

Further, a hollow space is preferably formed between the catalyst support and the wrought member.

In the forming of the surface electrodes, a surface of the wrought member put on the catalyst support is preferably roughened before the thermal-spraying.

In the roughening, a bonding region to which the surface electrode is bonded is preferably roughened and a non-bonding region to which the surface electrode is not bonded is preferably not roughened.

Advantageous Effects of Invention

According to the present invention, it is possible to provide an electrically heated catalyst device capable of maintaining the spreading of electric currents in the catalyst-support axis direction even when cracks occur in the catalyst-support circumference direction in the surface electrodes.

DESCRIPTION OF EMBODIMENTS

Specific exemplary embodiments to which the present invention is applied are explained hereinafter in detail with reference to the drawings. However, the present invention is not limited to the exemplary embodiments shown below. Further, for clarifying the explanation, the following descriptions and the drawings are simplified as appropriate.

(First Exemplary Embodiment)

Figure 1:
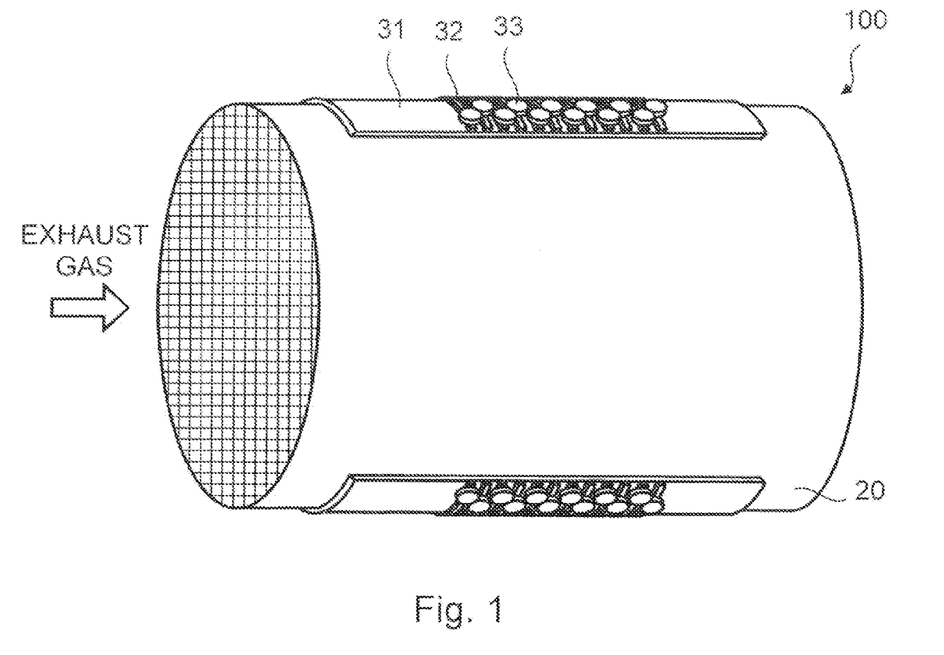
FIG. 1 is a perspective view of an electrically heated catalyst device 100 according to a first exemplary embodiment.
Figure 2:
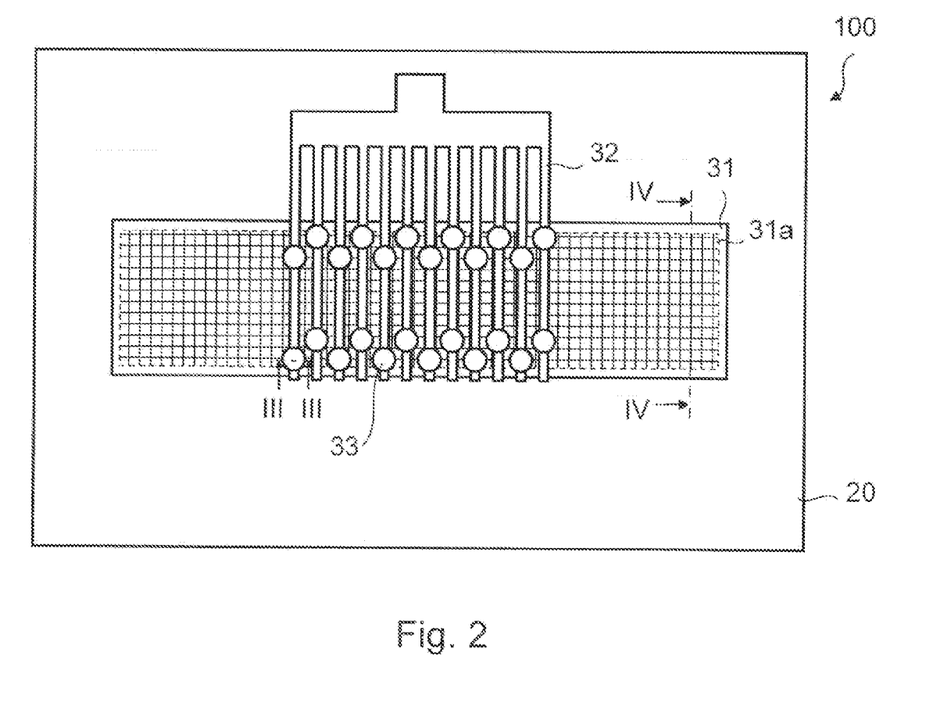
FIG. 2 is a plane view of an electrically heated catalyst device 100 according to a first exemplary embodiment as viewed from directly above a surface electrode 31.
Figure 3:
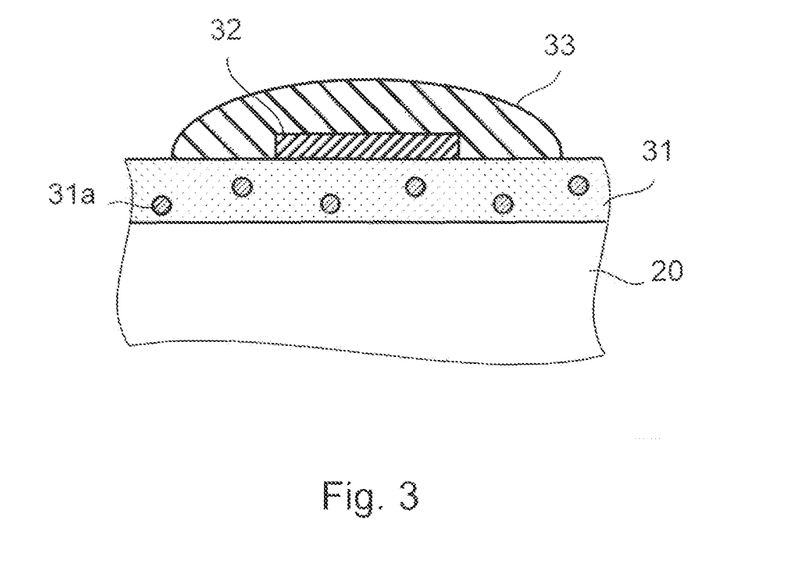
FIG. 3 is a cross section taken along the cutting line III-III in FIG. 2.
Figure 4:
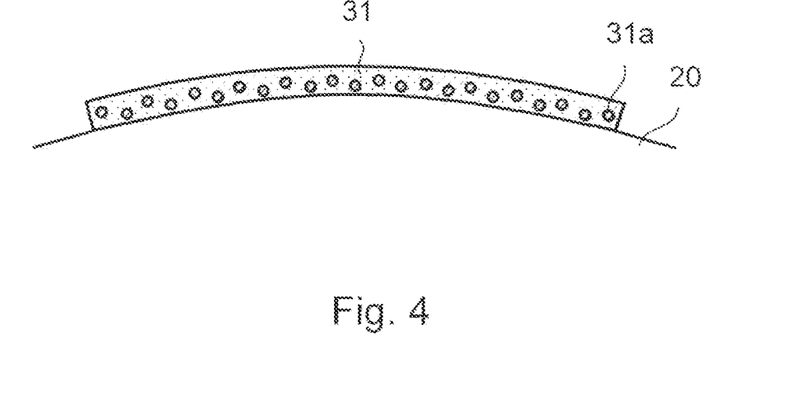
FIG. 4 is a cross section taken along the cutting line IV-IV in FIG. 2.

Firstly, an electrically heated catalyst device according to a first exemplary embodiment is explained with reference to FIGS. 1 to 4. FIG. 1 is a perspective view of an electrically heated catalyst device 100 according to the first exemplary embodiment. FIG. 2 is a plane view of the electrically heated catalyst device 100 according to the first exemplary embodiment as viewed from directly above a surface electrode 31. FIG. 3 is a cross section taken along the cutting line III-III in FIG. 2, and is a cross section in an area in which a fixing layer 33 is formed. FIG. 4 is a cross section taken along the cutting line IV-IV in FIG. 2.

The electrically heated catalyst device 100 is provided, for example, on an exhaust path of an automobile or the like, and purifies an exhaust gas discharged from the engine. As shown in FIG. 1, the electrically heated catalyst device 100 includes a catalyst support 20, surface electrodes 31, wiring lines 32, and fixing layers 33. Note that although FIG. 2 shows a positional relation among the catalyst support 20, the wiring lines 32, and the fixing layers 33 in one of the surface electrodes 31, the other surface electrode 31 also has a similar positional relation.

The catalyst support 20 is a porous member on which a catalyst such as platinum and palladium is supported. Further, since the catalyst support 20 is electrically heated itself, the catalyst support 20 is composed of a conductive ceramics, for example, SiC (silicon carbide). As shown in FIG. 1, the catalyst support 20 has roughly a cylindrical external shape and has a honeycomb structure inside thereof. As indicated by an arrow, an exhaust gas passes through the catalyst support 20 in the axial direction of the catalyst support 20.

As shown in FIG. 1, the surface electrodes 31 are a pair of electrodes that are disposed opposite to each other on the outer surface of the catalyst support 20. Further, as shown in FIG. 2, each of the surface electrodes 31 has a rectangular plane shape and extends in the catalyst-support axis direction. Note that the surface electrodes 31 are not formed in the areas near both ends in the catalyst-support axis direction. The surface electrodes 31 are connected to a power supply such as a battery through the wiring lines 32. Further, an electric current is supplied to the catalyst support 20 through the surface electrodes 31 and the catalyst support 20 is thereby electrically heated. Note that one of the surface electrodes 31 serves as a positive pole and the other surface electrode 31 serves as a negative pole. However, either one of the surface electrodes 31 can serve as a positive pole or a negative pole. That is, there is no restriction on the direction of the current flowing through the catalyst support 20.

Note that as shown in FIG. 2, a metal mesh 31a is buried inside each of the surface electrodes 31 as a wrought member made of metal that is disposed so as to extend in the catalyst-support axis direction. Further, as can be seen in the cross sections shown in FIGS. 3 and 4, the metal mesh 31a is buried inside each of the surface electrodes 31. Details of the metal mesh 31a are explained later.

As shown in FIG. 1, a plurality of wiring lines 32 are disposed on each of the pair of surface electrodes 31. The plurality of wiring lines 32 are a ribbon-like sheet metal that is physically in contact with and electrically connected to the surface electrode 31. The wiring lines 32 are preferably made of, for example, a heat-resistant (oxidation-resistant) alloy such as a stainless-steel-based alloy, a Ni-based alloy, and a Co-based alloy so that they can be used at a high temperature equal to or higher than 800° C.

Further, as shown in FIG. 2, the plurality of wiring lines 32 extend over the entire formation area of the surface electrode 31 in the catalyst-support circumference direction. Further, all of the wiring lines 32 protrude and extend from one side of the formation area of the surface electrode 31, and are integrated into one piece at the end of the protrusions. Further, the plurality of wiring lines 32 are arranged at roughly regular intervals along the catalyst-support axis direction on the surface electrode 31. In the electrically heated catalyst device 100 according to this exemplary embodiment, 12 wiring lines 32 are disposed in the central area in the axis direction of the catalyst support 20 on each of the surface electrodes 31. Needless to say, the number of the wiring lines 32 is not limited to 12 and can be arbitrarily determined.

Note that the catalyst support 20 is fixed and supported on an exhaust path by using a mat (not shown) made of heat-resistant material near both ends of the catalyst support 20 in the catalyst-support axis direction. If the wiring lines 32 come into contact with the mat, friction occurs between the wiring lines 32 and the mat due to the thermal cycle load, and thus raising a possibility that the wiring lines 32 could be broken. Therefore, the wiring lines 32 are disposed only in the central area in the catalyst-support axis direction in which the mat is not formed.

As shown in FIGS. 1 and 2, the wiring lines 32 are fixed to the surface electrode 31 by the fixing layers 33. Note that FIG. 3 is a cross section taken along the cutting line III-III in FIG. 2, and is a cross section in an area in which a fixing layer 33 is formed. As shown in FIG. 3, the surface electrode 31 is a thermal-sprayed film having a thickness of about 50 to 200 μm, formed on the outer surface of the catalyst support 20. The surface electrode 31 is physically in contact with and electrically connected to the catalyst support 20.

The fixing layers 33 are button-shaped thermal-sprayed films that are formed so as to cover the wiring lines 32 in order to fix the wiring lines 32 to the surface electrode 31. Note that the fixing layers 33 are formed in the button-shape in order to alleviate the stress that is caused by the difference between the linear expansion coefficient of the fixing layers 33 and the surface electrode 31, which are thermal-sprayed metal-based films, and the linear expansion coefficient of the catalyst support 20, which is made of a ceramics. That is, by reducing the size of each of the fixing layers 33 as much as possible, the above-described stress is alleviated. As shown in FIG. 2, the fixing layers 33 are physically in contact with and electrically connected to the wiring lines 32 and the surface electrode 31.

Further, as shown in FIG. 1, two fixing layers 33 are provided for each wiring line 32 in such a manner that the fixing layers 33 fix the wiring line 32 to the surface electrode 31 roughly at both ends in the catalyst-support circumference direction. Further, as shown in FIG. 3, the fixing layers 33 are arranged in such a manner that fixing layers 33 disposed on mutually-neighboring wiring lines 32 are staggered from each other in the catalyst-support circumference direction. In other words, on each of the surface electrodes 31, 12 fixing layers 33 are disposed in a staggered arrangement in the catalyst-support axis direction along each of the two long sides of the surface electrode 31 having a rectangular shape.

The thermal-sprayed films forming the surface electrodes 31 and the fixing layers 33 need to be made of metal-based material in order to let an electric current pass therethrough as in the case of the wiring lines 32. As a metal forming the matrix of the thermal-sprayed film, since it needs to be robust enough for use at a high temperature equal to or higher than 800° C., a metal having excellent oxidation resistance at a high temperature such as a Ni—Cr alloy (with a Cr content of 20 to 60 mass %) and an MCrAlY alloy (M is at least one material selected from Fe, Co and Ni) is preferable. Note that each of the above-described Ni—Cr alloy and the MCrAlY alloy may contain other alloy elements. The thermal-sprayed films forming the surface electrodes 31 and the fixing layers 33 may be porous films. By using porous films, the function of alleviating the stress is improved.

With the above-described structure, in the electrically heated catalyst device 100, the catalyst support 20 is electrically heated between the pair of surface electrodes 31 and the catalyst supported on the catalyst support 20 is thereby activated. In this way, unburned HC (hydrocarbon), CO (carbon monoxide), NOx (nitrogen oxide), and the like contained in an exhaust gas that passes through the catalyst support 20 are removed by the catalytic reaction.

Next, details of the metal mesh 31a are explained. As shown in FIG. 2, the metal mesh 31a is buried under roughly the entire surface of the formation area of the surface electrode 31. The structure like this can be formed by putting the metal mesh 31a on the catalyst support 20 and then forming the surface electrode 31 composed of a thermal-sprayed film over this metal mesh 31a.

With the structure like this, in the electrically heated catalyst device 100 according to this exemplary embodiment, since the metal mesh 31a extending in the catalyst-support axis direction is buried in each of the surface electrodes 31, the spreading of electric currents in the catalyst-support axis direction through this metal mesh 31a can be maintained even when cracks occur in the catalyst-support circumference direction in the surface electrode 31. Therefore, the area near the center in the axis direction of the catalyst support 20 is not intensively heated, and thus making it possible to avoid the thermal-stress cracking due to this intensive heating.

Further, the catalyst support 20 is fixed and supported on an exhaust path by using a mat (not shown) made of heat-resistant material near its both ends in the catalyst-support axis direction. If the metal mesh 31a is disposed on the surface of the surface electrode 31, friction occurs between the metal mesh 31a and the mat due to the thermal cycle load, and thus raising a possibility that the metal wires forming the metal mesh 31a could be broken. However, since the metal mesh 31a according to this exemplary embodiment is buried in the surface electrode 31, the friction never occurs between the metal mesh 31a and the mat even by the thermal cycle load. Therefore, there is no risk that the metal wires forming the metal mesh 31a are broken.

Note that the metal mesh 31a is physically in contact with and electrically connected to the surface electrode 31. The metal mesh 31a is preferably formed, for example, from wires having a diameter of 0.1 mm or narrower, made of a heat-resistant (oxidation-resistant) alloy such as a stainless-steel-based alloy, a Ni-based alloy, and a Co-based alloy and so that they can be used at a high temperature equal to or higher than 800° C. As described above, the metal mesh 31a is fixed to the catalyst support 20 by putting the metal mesh 31a on the catalyst support 20 and then forming the surface electrode 31 composed of a thermal-sprayed film over this metal mesh 31a. Therefore, the metal mesh 31a is preferably weaved in such a manner that certain space is formed between neighboring metal wires, such as a plain weave, a flat-top weave, a diamond weave, and a hexagonal weave. Further, the mesh size is preferably 50 or smaller.

Figure 5:
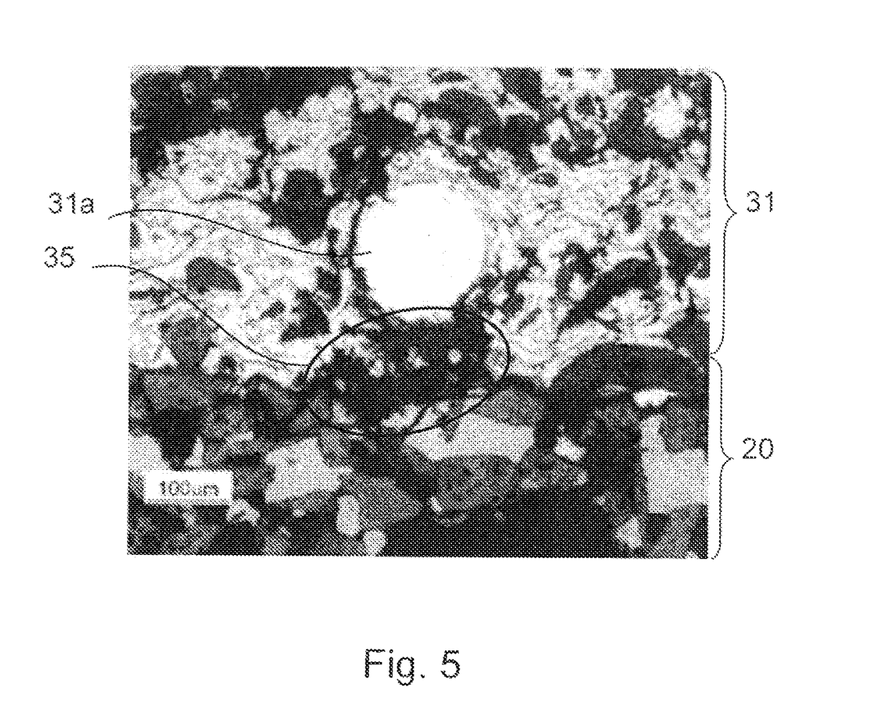
FIG. 5 is a photograph of a cross section at a bonding interface between a catalyst support 20 and a surface electrode 31.

Note that FIG. 5 is a photograph of a cross section at a bonding interface between the catalyst support 20 and the surface electrode 31. As can be seen from FIG. 5, since the surface electrode 31 is formed by thermal spraying performed over the metal mesh 31a, a hollow space 35 is formed immediately below the metal mesh 31a. That is, the metal mesh 31a is not bonded to the catalyst support 20. Since the hollow space (non-bonding region) 35 is formed immediately below the metal mesh 31a as described above, the thermal stress that is caused by the difference between the linear expansion coefficient of the surface electrode 31 and the metal mesh 31a made of metallic material and that of the catalyst support 20 made of the ceramic material can be alleviated. In particular, since the hollow space 35 is formed so as to conform to the shape of the metal mesh 31a, the surface electrode 31 has a pseudo-segment structure. Therefore, the thermal stress can be effectively restrained.

Note that in order to bond the surface electrode 31, which is a thermal-sprayed film, to the metal mesh 31a, it is necessary to roughen the surface of the metal mesh 31a by performing a shot-blast process before the surface electrode 31 is thermal-sprayed. The bonding region between the metal mesh 31a and the surface electrode 31 can secure the current-carrying property. Meanwhile, the non-bonding region between the metal mesh 31a and the surface electrode 31 can alleviate the thermal stress between the surface electrode 31 and metal mesh 31a. Therefore, the shot-blast process may be performed on the surface of the metal mesh 31a in such a manner that part of the metal mesh 31a is not treated by the shot-blast process by using a mask or the like. In this way, it is possible to optimize the balance between the above-mentioned current-carrying property and the alleviation of the thermal stress.

Figure 6:
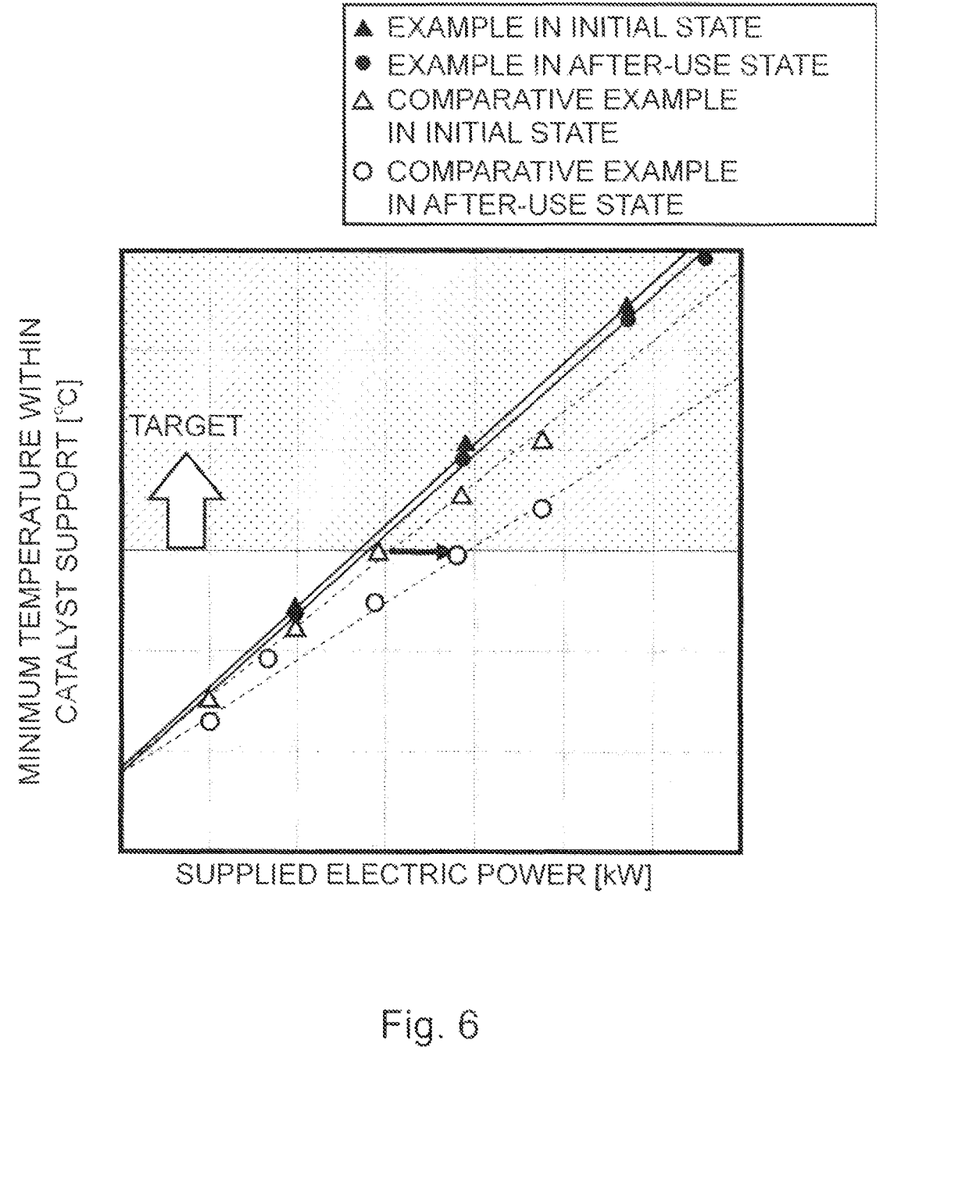
FIG. 6 is a graph showing the dependence of the minimum temperature within a catalyst support 20 on supplied electric power.
Figure 7:
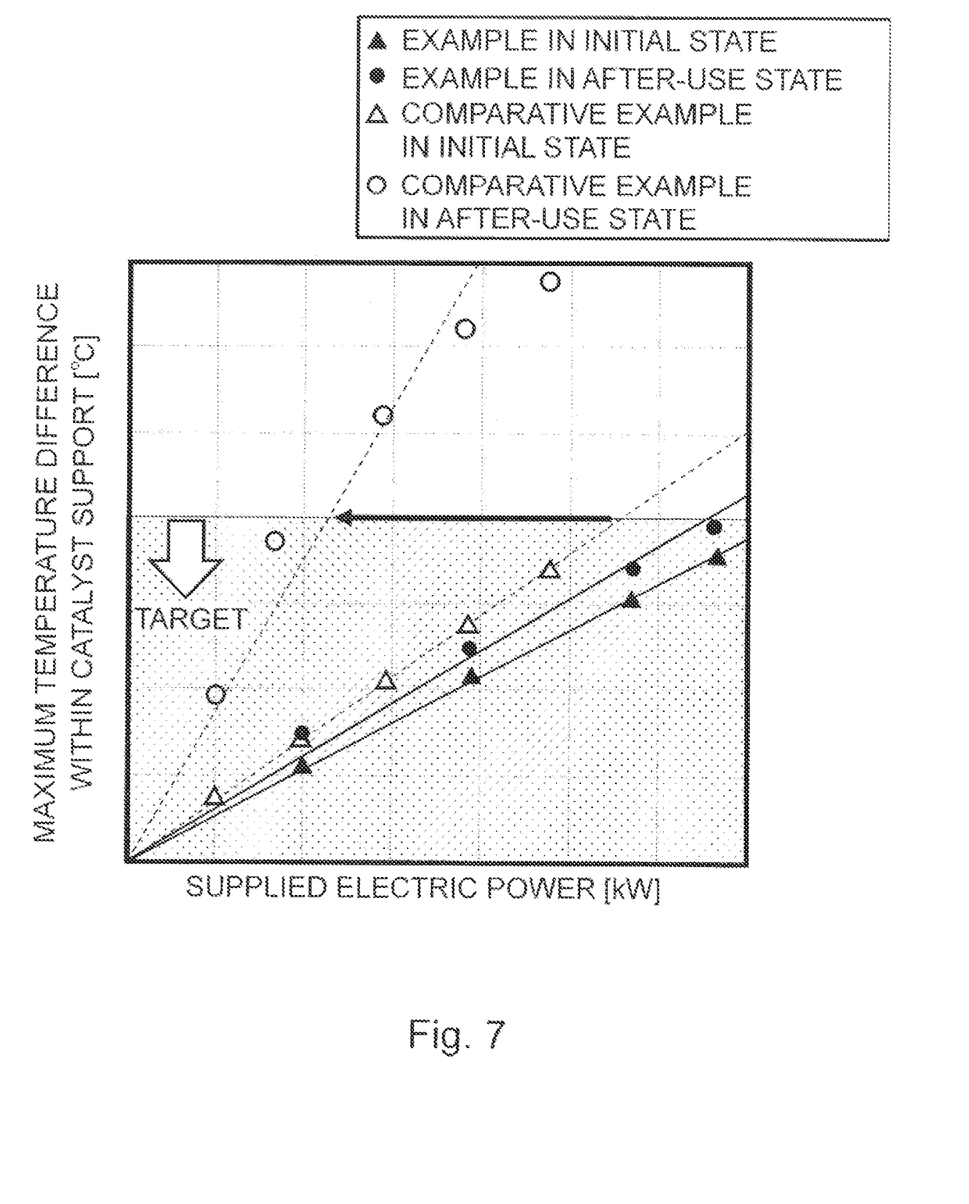
FIG. 7 is a graph showing the dependence of the maximum temperature difference within a catalyst support 20 on supplied electric power.

Next, advantageous effects of an example of the electrically heated catalyst device 100 according to this exemplary embodiment are explained with reference to FIGS. 6 and 7. The comparative example is identical to the example except that the comparative example does not include the metal mesh 31a. FIG. 6 is a graph showing the dependence of the minimum temperature within the catalyst support 20 on supplied electric power. FIG. 7 is a graph showing the dependence of the maximum temperature difference within the catalyst support 20 on supplied electric power. In FIGS. 6 and 7, the horizontal axis indicates supplied electric power (kW). The vertical axis of FIG. 6 indicates minimum temperatures (° C.) within the catalyst support 20 and the vertical axis of FIG. 7 indicates maximum temperature differences (° C.) within the catalyst support 20. In both graphs, specific numerical values are omitted. Therefore, they indicate qualitative tendencies.

As shown in FIG. 6, the supplied electric power required for raising the minimum temperature within the catalyst support 20 to or above a target value in the example of the electrically heated catalyst device 100 according to this exemplary embodiment is smaller than that in the comparative example even in the initial state. In addition, the supplied electric power hardly increases even in the "after-use" state corresponding to a state after a 30 km traveling. In contrast to this, in the comparative example, the supplied electric power increases significantly in the "after-use" state in comparison to that in the initial state as indicated by an arrow in the graph.

As shown in FIG. 7, in order to lower the maximum temperature difference within the catalyst support 20 to or below a target value, it is desirable that the supplied electric power is as small as possible. Therefore, the larger the maximum supplied electric power with which the maximum temperature difference can be lowered to or below the target value is, the better the electrically heated catalyst device is. In the example, the above-mentioned maximum supplied electric power is larger than that of the comparative example even in the initial state. In addition, the maximum supplied electric power does not decrease even in the after-use" state. In contrast to this, in the comparative example, the maximum supplied electric power decreases significantly in the after-use" state in comparison to that in the initial state as indicated by an arrow in the graph.

Note that it is necessary to supply the supplied electric power with which both the target value for the minimum temperature and the target value for the maximum temperature difference within the catalyst support 20 shown in FIGS. 6 and 7 are satisfied. However, in the case of the comparative example, any supplied electric power cannot satisfy both target values simultaneously in the after-use" state. In contrast to this, in the case of the example, there is supplied electric power with which both target values are simultaneously satisfied even in the after-use" state. That is, in the example, even when the surface electrodes 31 have deteriorated (corresponding to "after-use state" in FIGS. 6 and 7), the spreading of electric currents in the catalyst-support axis direction can be secured by the metal mesh 31a. Therefore, the minimum temperature within the catalyst support 20 can be maintained at a high temperature and the maximum temperature difference can be maintained at a small value. In the comparative example, when the surface electrodes 31 have deteriorated (corresponding to "after-use state" in FIGS. 6 and 7), the spreading of electric currents in the catalyst-support axis direction is hampered. Therefore, the central area in the axis direction of the catalyst support 20 is intensively heated while both ends in the catalyst-support axis direction cannot be easily heated. Therefore, the minimum temperature within the catalyst support 20 is lowered and the maximum temperature difference increases significantly.

(Second Exemplary Embodiment)

Figure 8:
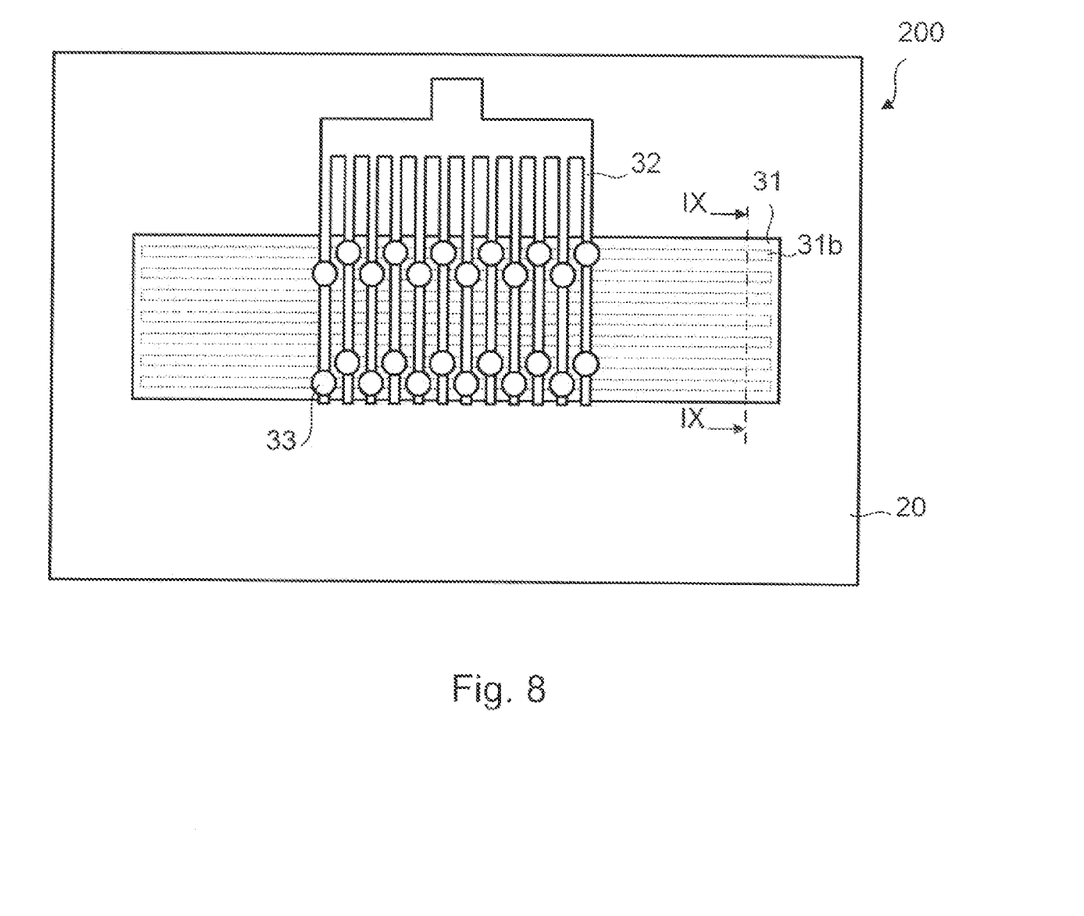
FIG. 8 is a plane view of an electrically heated catalyst device 200 according to a second exemplary embodiment as viewed from directly above a surface electrode 31.
Figure 9:
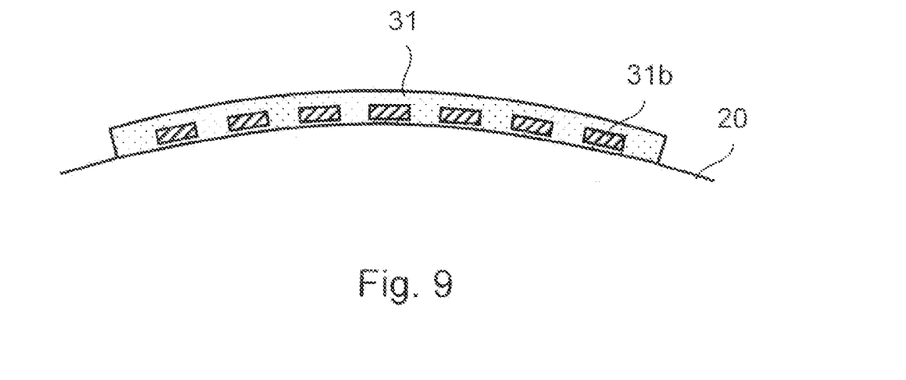
FIG. 9 is a cross section taken along the cutting line IX-IX in FIG. 8.

Next, an electrically heated catalyst device according to a second exemplary embodiment is explained with reference to FIGS. 8 and 9. FIG. 8 is a plane view of an electrically heated catalyst device 200 according to the second exemplary embodiment as viewed from directly above a surface electrode 31. FIG. 9 is a cross section taken along the cutting line IX-IX in FIG. 8. As shown in FIG. 8, in the electrically heated catalyst device 200 according to the second exemplary embodiment, metal wires 31b are buried in place of the metal mesh 31a according to the first exemplary embodiment as a wrought member made of metal that is disposed so as to extend in the catalyst-support axis direction, inside the surface electrode 31. Further, as can be also seen from FIG. 9, metal wires 31b having a rectangular shape in cross section are buried inside the surface electrode 31. Needless to say, the metal wires 31b may have other cross-section shapes such as a circle.

As shown in FIG. 8, a plurality of metal wires 31b are buried under roughly the entire surface of the formation area of the surface electrode 31. Each of the metal wires 31b is buried over the entire formation area in the catalyst-support axis direction in the surface electrode 31. Further, the plurality of lines 31b are arranged at roughly regular intervals along the catalyst-support circumference direction on each of the surface electrodes 31. In the example shown in FIG. 8, seven metal wires 31b are disposed in parallel inside the surface electrode 31. Needless to say, the number of the metal wires 31b is not limited to any particular number. Similarly to the metal mesh 31a according to the first exemplary embodiment, the metal wires 31b are preferably made of, for example, a heat-resistant (oxidation-resistant) alloy such as a stainless-steel-based alloy, a Ni-based alloy, and a Co-based alloy. As for the cross-section size, when the metal line is circular in cross section, the diameter is preferably 0.2 mm or smaller. Further, when the metal line is rectangular in cross section, the thickness is preferably 0.2 mm or smaller and the width is preferably 5 mm or smaller.

With the structure like this, in the electrically heated catalyst device 200 according to this exemplary embodiment, since the metal wires 31b extending in the catalyst-support axis direction are buried in each of the surface electrodes 31, the spreading of electric currents in the catalyst-support axis direction through these metal wires 31b can be maintained even when cracks occur in the catalyst-support circumference direction in the surface electrode 31. Therefore, the area near the center in the axis direction of the catalyst support 20 is not intensively heated, and thus making it possible to avoid the thermal-stress cracking due to this intensive heating.

Further, similarly to the metal mesh 31a according to the exemplary embodiment, since the metal wires 31b are buried in the surface electrode 31, the friction never occurs between the metal wires 31b and the mat even by the thermal cycle load. Therefore, there is no risk that the metal wires 31b are broken.

Note that since the surface electrode 31 is formed by thermal spraying performed over the metal wires 31b, hollow spaces (not shown) are formed immediately below the metal wires 31b. That is, the metal wires 31b are not bonded to the catalyst support 20. Since the hollow spaces (non-bonding regions) are formed immediately below the metal wires 31b as described above, the thermal stress that is caused by the difference between the linear expansion coefficient of the surface electrode 31 and the metal wires 31b made of metallic material and that of the catalyst support 20 made of the ceramic material can be alleviated.

Note that in order to bond the surface electrode 31, which is a thermal-sprayed film, to the metal wires 31b, it is necessary to roughen the surfaces of the metal wires 31b by performing a shot-blast process before the surface electrode 31 is thermal-sprayed. The bonding regions between the metal wires 31b and the surface electrode 31 can secure the current-carrying property. Meanwhile, the non-bonding regions between the metal wires 31b and the surface electrode 31 can alleviate the thermal stress between the surface electrode 31 and metal wires 31b. Therefore, the shot-blast process may be performed on the surface of the metal wires 31b in such a manner that parts of the metal wires 31b are not treated by the shot-blast process by using a mask or the like. In this way, it is possible to optimize the balance between the above-mentioned current-carrying property and the alleviation of the thermal stress. The other structure is similar to that of the first exemplary embodiment, and therefore its explanation is omitted.

Figure 10:
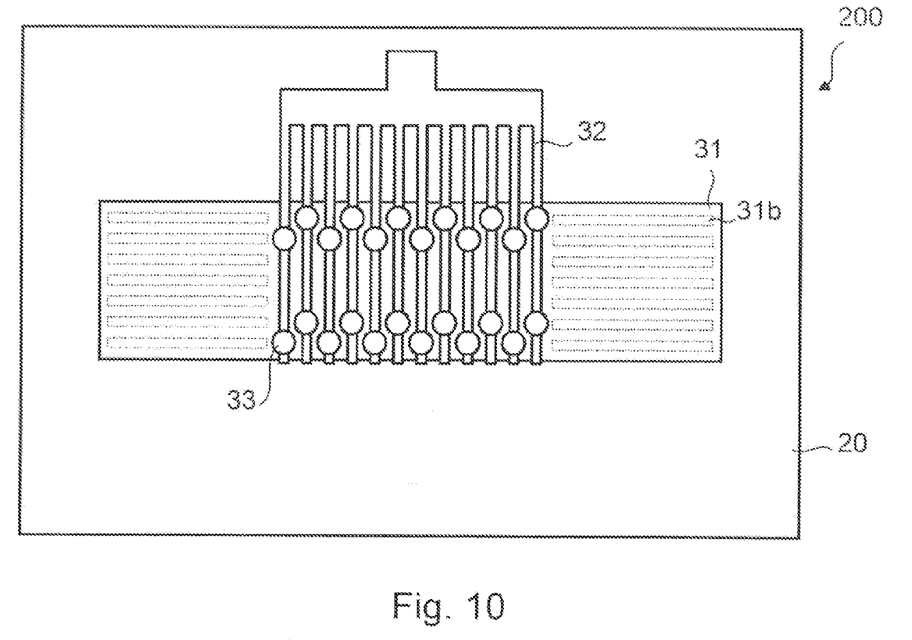
FIG. 10 is a plane view of an electrically heated catalyst device 200 according to a modified example of a second exemplary embodiment as viewed from directly above a surface electrode 31.
Figure 11:
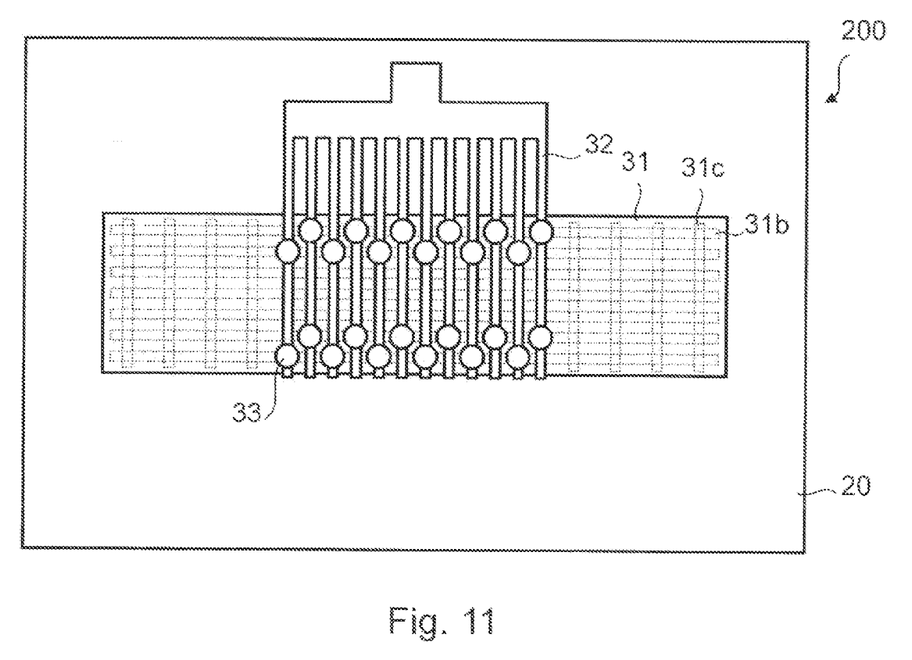
FIG. 11 is a plane view of an electrically heated catalyst device 200 according to a modified example of a second exemplary embodiment as viewed from directly above a surface electrode 31.
Figure 12:
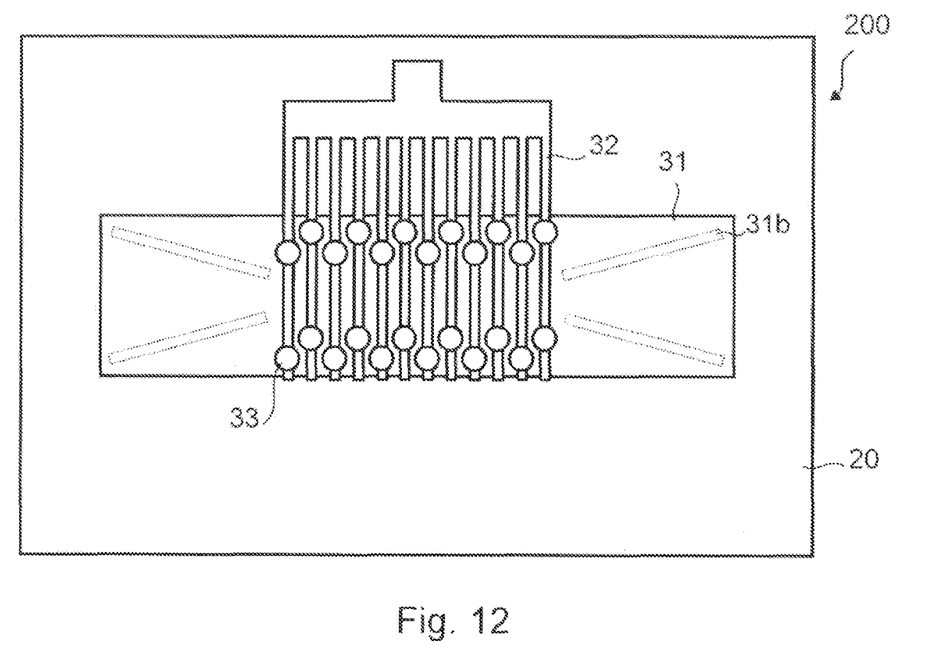
FIG. 12 is a plane view of an electrically heated catalyst device 200 according to a modified example of a second exemplary embodiment as viewed from directly above a surface electrode 31.

Next, modified examples of the second exemplary embodiment are explained with reference to FIGS. 10 to 12. Each of FIGS. 10 to 12 is a plane view of an electrically heated catalyst device 200 according to a modified example of the second exemplary embodiment as viewed from directly above a surface electrode 31. Each of these electrically heated catalyst devices 200 shown in FIGS. 10 to 12 can provide similar advantageous effects to those of the electrically heated catalyst device 200 shown in FIG. 8.

As shown as another example of the electrically heated catalyst device 200 in FIG. 10, the metal wires 31b may not be disposed in the central area in the catalyst-support axis direction in the surface electrode 31 in which the wiring lines 32 are connected. That is, the metal wires 31b may be divided into two sections and these two sections may be disposed on both sides of the surface electrode 31 with the central area in the catalyst-support axis direction of the surface electrode 31 interposed therebetween.

As shown as another example of the electrically heated catalyst device 200 in FIG. 11, metal lines 31c extending in the catalyst-support circumference direction may be also disposed in addition to the metal wires 31b extending in the catalyst-support axis direction. The configuration like this resembles the metal mesh 31a according to the first exemplary embodiment.

As shown as another example of the electrically heated catalyst device 200 in FIG. 12, the metal wires 31b may not be disposed in the central area in the catalyst-support axis direction in the surface electrode 31 in which the wiring lines 32 are connected. That is, the metal wires 31b may be divided into two sections and these two sections may be disposed on both sides of the surface electrode 31 with the central area in the catalyst-support axis direction of the surface electrode 31 interposed therebetween. Further, the metal wires 31b may be disposed in an oblique direction(s) with respect to the catalyst-support axis direction. In the example shown in FIG. 12, four metal wires 31b are arranged in a radial pattern, extending from the central area in the catalyst-support axis direction of the surface electrode 31 toward the four corners of the surface electrode 31.

(Third Exemplary Embodiment)

Figure 13:
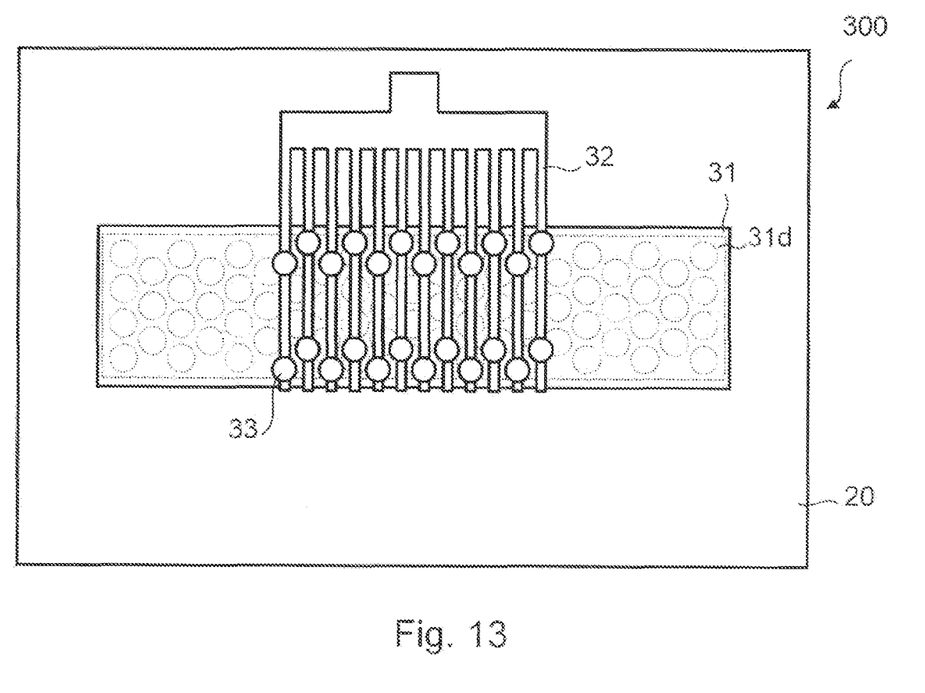
FIG. 13 is a plane view of an electrically heated catalyst device 300 according to a third exemplary embodiment as viewed from directly above a surface electrode 31.
Figure 14A:
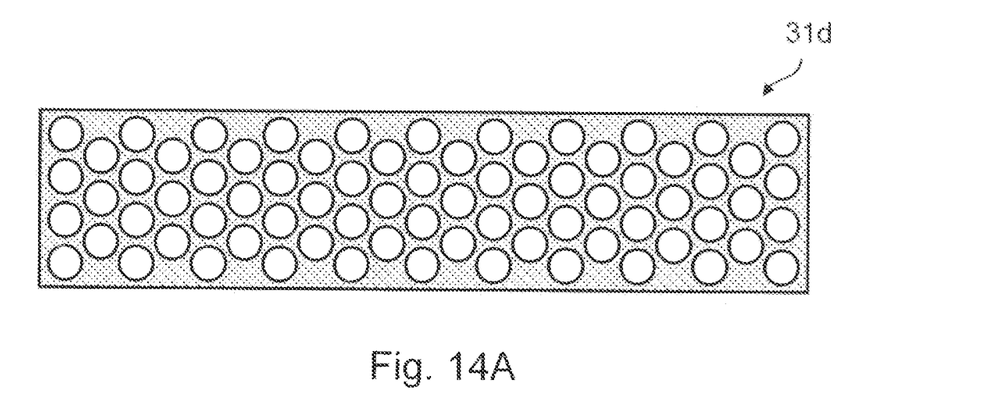
FIG. 14A is a plane view of a perforated metal plate 31*d* of an electrically heated catalyst device 300 according to a third exemplary embodiment.

Next, an electrically heated catalyst device according to a third exemplary embodiment is explained with reference to FIGS. 13 and 14A. FIG. 13 is a plane view of an electrically heated catalyst device 300 according to the third exemplary embodiment as viewed from directly above a surface electrode 31. FIG. 14A is a plane view of a perforated metal (punching metal) plate 31d of the electrically heated catalyst device 300 according to the third exemplary embodiment. As shown in FIG. 13, in the electrically heated catalyst device 300 according to the third exemplary embodiment, a perforated metal plate 31d is buried in place of the metal mesh 31a according to the first exemplary embodiment as a wrought member made of metal that is disposed so as to extend in the catalyst-support axis direction, inside the surface electrode 31.

As shown in FIG. 13, one perforated metal plate 31d is buried under roughly the entire surface of the formation area of the surface electrode 31. As shown in FIG. 14A, a large number of punched-out holes are arranged in an orderly pattern in the perforated metal plate 31d. Similarly to the metal mesh 31a according to the first exemplary embodiment, the perforated metal plate 31d is preferably made of, for example, a heat-resistant (oxidation-resistant) alloy such as a stainless-steel-based alloy, a Ni-based alloy, and a Co-based alloy. Note that the perforated metal plate 31d may be divided into multiple sections.

With the structure like this, in the electrically heated catalyst device 300 according to this exemplary embodiment, since the perforated metal plate 31d extending in the catalyst-support axis direction is buried in each of the surface electrodes 31, the spreading of electric currents in the catalyst-support axis direction through this perforated metal plate 31d can be maintained even when cracks occur in the catalyst-support circumference direction in the surface electrode 31. Therefore, the area near the center in the axis direction of the catalyst support 20, in which the wiring lines 32 are connected, is not intensively heated, and thus making it possible to avoid the thermal-stress cracking due to this intensive heating.

Further, similarly to the metal mesh 31a according to the exemplary embodiment, since the perforated metal plate 31d is buried in the surface electrode 31, the friction never occurs between the perforated metal plate 31d and the mat by the thermal cycle load. Therefore, there is no risk that the perforated metal plate 31d is broken.

Note that since the surface electrode 31 is formed by thermal spraying performed over the perforated metal plate 31d, a hollow space (not shown) is formed immediately below the perforated metal plate 31d. That is, the perforated metal plate 31d is not bonded to the catalyst support 20. Since the hollow space (non-bonding region) is formed immediately below the perforated metal plate 31d as described above, the thermal stress that is caused by the difference between the linear expansion coefficient of the surface electrode 31 and the perforated metal plate 31d made of metallic material and that of the catalyst support 20 made of the ceramic material can be alleviated. In particular, since the hollow space is formed so as to conform to the shape of the perforated metal plate 31d, the surface electrode 31 has a pseudo-segment structure. Therefore, the thermal stress can be effectively restrained.

Note that in order to bond the surface electrode 31, which is a thermal-sprayed film, to the perforated metal plate 31d, it is necessary to roughen the surfaces of the perforated metal plate 31d by performing a shot-blast process before the surface electrode 31 is thermal-sprayed. The bonding regions between the perforated metal plate 31d and the surface electrode 31 can secure the current-carrying property. Meanwhile, the non-bonding regions between the perforated metal plate 31d and the surface electrode 31 can alleviate the thermal stress between the surface electrode 31 and perforated metal plate 31d. Therefore, the shot-blast process may be performed on the surface of the perforated metal plate 31d in such a manner that part of the perforated metal plate 31d is not treated by the shot-blast process by using a mask or the like. In this way, it is possible to optimize the balance between the above-mentioned current-carrying property and the alleviation of the thermal stress. The other structure is similar to that of the first exemplary embodiment, and therefore its explanation is omitted.

Figure 14B:
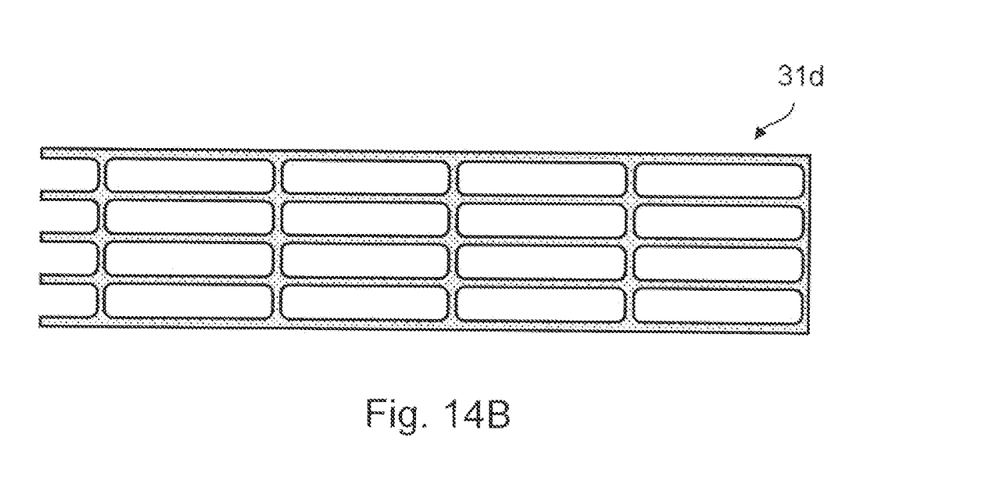
FIG. 14B is a plane view of a perforated metal plate 31*d* of an electrically heated catalyst device 300 according to a modified example of a third exemplary embodiment.
Figure 14C:
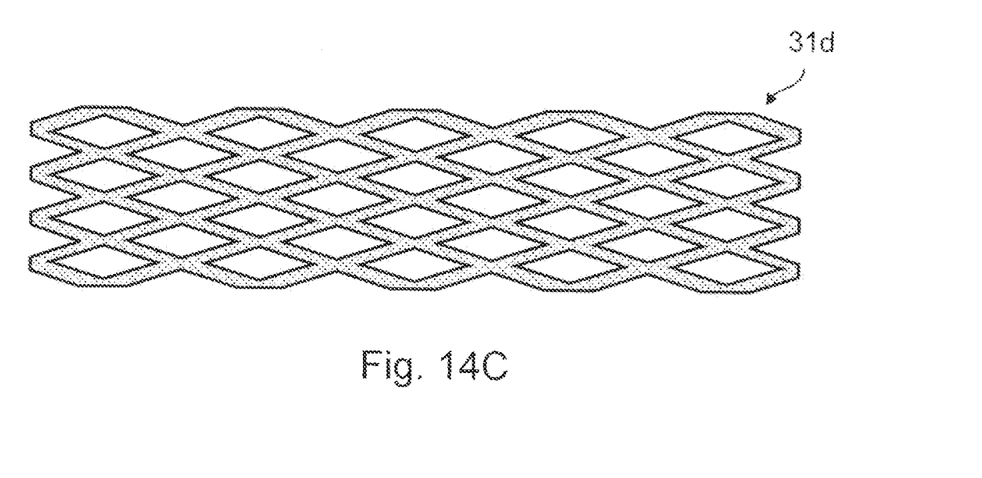
FIG. 14C is a plane view of a perforated metal plate 31*d* of an electrically heated catalyst device 300 according to a modified example of a third exemplary embodiment.

Next, modified examples of the third exemplary embodiment are explained with reference to FIGS. 14B and 14C. Each of FIGS. 14B and 14C is a plane view of a perforated metal plate 31d of an electrically heated catalyst device 300 according to a modified example of a third exemplary embodiment. By using either one of the perforated metal plates 31d shown in FIGS. 14B and 14C, similar advantageous effects to those of the electrically heated catalyst device 300 shown in FIG. 13 can be achieved.

As shown in FIG. 14B, the perforated metal plate 31d may have punched-out holes having a rectangular shape. Further, as shown in FIG. 14C, the perforated metal plate 31d may have punched-out holes having a diamond shape. Note that the shape of the punched-out holes is not restricted to any particular shape. That is, they may have any shape.

Note that the present invention is not limited to the above-described exemplary embodiments, and various modifications can be made without departing from the spirit of the present invention. For example, metal fibers having a diameter of 0.01 to 0.15 mm may be buried as a wrought member made of metal that is disposed so as to extend in the catalyst-support axis direction, inside the surface electrode.

REFERENCE SIGNS LIST

20 CATALYST SUPPORT
31 SURFACE ELECTRODE
31A METAL MESH
31B, 31C METAL WIRE
31D PERFORATED METAL PLATE
32 WIRING LINE
33 FIXING LAYER
35 HOLLOW SPACE
100, 200, 300 ELECTRICALLY HEATED CATALYST DEVICE

The invention claimed is:

1. An electrically heated catalyst device comprises:
    a catalyst support comprising a ceramics, on which a catalyst is supported;
    a pair of surface electrodes disposed on an outer surface of the catalyst support, the surface electrodes being disposed opposite to each other and extending in an axial direction of the catalyst support; and
    a wiring line that externally supplies electric power to the surface electrodes, wherein
    the catalyst support is electrically heated through the surface electrodes, and
    a wrought member made of metal is buried in the surface electrodes, the wrought member extending in the axial direction of the catalyst support.

2. The electrically heated catalyst device according to claim 1, wherein the wrought member is one of a mesh, wires, and a perforated plate.

3. The electrically heated catalyst device according to claim 1, wherein the surface electrodes are formed by thermal spraying.

4. The electrically heated catalyst device according to claim 3, wherein a hollow space is formed between the catalyst support and the wrought member.

5. The electrically heated catalyst device according to claim 3, wherein the wrought member comprises:
    a bonding region to which the surface electrode is bonded; and
    a non-bonding region to which the surface electrode is not bonded.

6. The electrically heated catalyst device according to claim 1, wherein the wrought member is made of one of a stainless-steel-based alloy, a Ni-based alloy, and a Co-based alloy.

7. The electrically heated catalyst device according to claim 1, wherein a connection area in the surface electrode in which the wiring line is connected is located at a center in the axial direction of the catalyst support.

8. The electrically heated catalyst device according to claim 1, wherein the ceramics comprises SiC.

9. The electrically heated catalyst device according to claim 1, wherein the surface electrode comprises a Ni-Cr alloy (with a Cr content of 20 to 60 mass %) or an MCrAlY alloy (M is at least one material selected from Fe, Co and Ni).

10. A manufacturing method of an electrically heated catalyst device that electrically heats a catalyst support comprising a ceramics, on which a catalyst is supported, through surface electrodes formed on a surface of the catalyst support, the manufacturing method comprising:
   forming a pair of the surface electrodes disposed on an outer surface of the catalyst support, the surface electrodes being disposed opposite to each other and extending in an axial direction of the catalyst support; and
   connecting a wiring line that externally supplies electric power to the surface electrodes,
   wherein in the forming of the surface electrodes, a wrought member made of metal is buried in the surface electrodes, the wrought member extending in the axial direction of the catalyst support.

11. The manufacturing method of an electrically heated catalyst device according to claim 10, wherein the wrought member is one of a mesh, wires, and a perforated plate.

12. The manufacturing method of an electrically heated catalyst device according to claim 10, wherein in the forming of the surface electrodes, a thermal-spraying is performed over the wrought member put on the catalyst support.

13. The manufacturing method of an electrically heated catalyst device according to claim 12, wherein a hollow space is formed between the catalyst support and the wrought member.

14. The manufacturing method of an electrically heated catalyst device according to claim 12, wherein in the forming of the surface electrodes, a surface of the wrought member put on the catalyst support is roughened before the thermal-spraying.

15. The manufacturing method of an electrically heated catalyst device according to claim 14, wherein in the roughening, a bonding region to which the surface electrode is bonded is roughened and a non-bonding region to which the surface electrode is not bonded is not roughened.

* * * * *